United States Patent

Findlay

[15] 3,688,058

[45] Aug. 29, 1972

[54] INCREMENTAL DATA-PROCESSING SPROCKETED TAPE DECK

[72] Inventor: John S. Findlay, Wilmette, Ill.

[73] Assignee: Microdyne, Inc., Rolling Meadows, Ill.

[22] Filed: Aug. 28, 1970

[21] Appl. No.: 67,876

[52] U.S. Cl. ...............179/100.2 Z, 226/76, 274/4 D

[51] Int. Cl.....G11b 15/20, G11b 15/34, G11b 23/08

[58] Field of Search..179/100.2 Z, 100.2 T, 100.2 R; 226/76, 152, 91; 178/6.6 A; 274/4 D, 11 E; 346/74 M

[56] References Cited

UNITED STATES PATENTS

| | | |
|---|---|---|
| 3,289,189 | 11/1966 | Clark ......................346/74 M |
| 3,405,402 | 10/1968 | Smith-Vaniz............346/74 M |
| 3,332,084 | 7/1967 | Wamrer et al. .....226/152 UX |
| 3,512,694 | 5/1970 | Sugaya et al................226/91 |
| 2,924,669 | 2/1960 | Schmidt et al. .....179/100.2 Z |

FOREIGN PATENTS OR APPLICATIONS

| | | |
|---|---|---|
| 1,537,240 | 10/1969 | Germany............179/100.2 Z |

*Primary Examiner*—Bernard Konick
*Assistant Examiner*—Jay P. Lucas
*Attorney*—Kinzer, Dorn and Zickert

[57] ABSTRACT

An incremental data-processing tape deck for use with cartridge-housed magnetic tape punched for a sprocket drive, comprising a recording and reproducing transducer mounted near a drive sprocket, with a movable slide to quide the tape into engagement with the transducer and the sprocket. The slide is actuated by a hold-down device that latches the tape cartridge in operating position. Incremental or slow continuous tape advance is effected by the sprocket, with tape take-up afforded by a first spindle actuated through a slip clutch. The same spindle can be driven directly for fast forward motion of the tape; a second concentric spindle provides for fast reverse tape movement. A tape tensioner maintains the tape in engagement with the transducer.

12 Claims, 12 Drawing Figures

Inventor
John S. Findlay
By Kinzer, Dorn and Zickert
Attorneys

Inventor
John S. Findlay
By Kinzer, Dorn and Zickert
Attorneys

Inventor
John S. Findlay
By Kinzer, Dorn and Zickert
Attorneys

Inventor
John S. Findlay
By Kinzer, Dorn and Zickert
Attorneys

Inventor
John S. Findlay
By Kinzer, Dorn and Zickert
Attorneys

Inventor
John S. Findlay
By Kinzer, Dorn and Zickert
Attorneys

Inventor
John S. Findlay
By Kinzer, Dorn and Zickert
Attorneys

INCREMENTAL DATA-PROCESSING SPROCKETED TAPE DECK

CROSS REFERENCE TO RELATED APPLICATION

This application relates to a tape deck that utilizes the magnetic tape cartridge disclosed and claimed in the co-pending application of John S. Findlay, Ser. No. 67,877 filed concurrently herewith.

BACKGROUND OF THE INVENTION

There are a number of uses for cartridge-housed magnetic tapes in precision, high repeatability data-processing work. A common example is the magnetic tape controlled typewriter, in which a variety of different document forms may be stored on magnetic tape for reproduction by the typewriter as desired, with additional data being inserted manually at given points in the documents. Another example is the maintenance of a continuing "inventory" with respect to each individual patient in a hospital; the patient carries with him at all times a magnetic tape cartridge upon which test, diagnosis, and treatment data are recorded. At any given time, it may be necessary to re-claim information from a specific part of the tape for accurate and effective guidance of further treatment. Other such "inventory" applications requiring multiple tape cartridges and precision recording and read-out from those cartridges, over long time spans, are becoming more and more common.

Magnetic tape recording systems of this general kind, including both the tape cartridges and the tape decks, have encountered substantial and difficult technical problems. The conventional capstan drive employed for most magnetic tape recording and reproducing apparatus, including both data processing equipment and entertainment equipment, presents a continuing potential for slippage, accumulative error, homing inconsistencies, and other like difficulties. Many of these problems can be overcome by the use of a sprocket drive similar to that often employed for punched paper tapes. But the sprocket drive itself introduces some difficult problems, particularly relating to initial engagement of the sprocket and maintenance of the sprocket in engaged condition during operation. Furthermore, the sprocket drive, unless carefully controlled, inherently creates a possible tape breakage situation due to the positive engagement between the tape and the driving sprocket.

SUMMARY OF THE INVENTION

It is a principal object of the present invention, therefore, to provide a new and improved tape deck for precision data processing systems that utilize cartridge-housed magnetic tapes, in which the difficulties of slippage, accumulative error, homing inconsistencies, and the like normally prevalent in a capstan drive system are effectively eliminated by the utilization of a positive sprocket drive.

A related object of the invention is to provide a new and improved sprocket drive system for a tape deck that utilizes cartridge-housed magnetic tape in a precision data recording process, which sprocket drive includes a simple yet effective means for initially engaging the tape with the sprocket and for maintaining the tape continuously in engagement with the sprocket without substantial possibility of breaking the tape as the result of operation of the sprocket.

Another object of the invention is to provide a new and improved tape deck for precision data processing applications, using a cartridge-mounted magnetic tape, that is compact and rugged and may be used with virtually any orientation of the tape deck and the tape cartridge.

A specific object of the invention is to provide a new and improved over-travel stop mechanism for use in a precision data processing tape deck to facilitate a higher density recording operation without a loss of data.

A specific object of the invention is to provide a positive, directly verifiable continuous index of the current position of the tape in a magnetic cartridge in the course of operation of a tape deck during recording or playback of the tape.

A further object of the invention is to provide a new and improved precision data processing tape deck for use with cartridge-housed magnetic tape that will operate reliably over a temperature range from −40° to +140°F., that can use any of a wide variety of different drive motors, and that will continue to operate virtually indefinitely, yet is relatively simple and quite compact in construction.

DESCRIPTION OF THE PREFERRED EMBODIMENT

Figure 1:
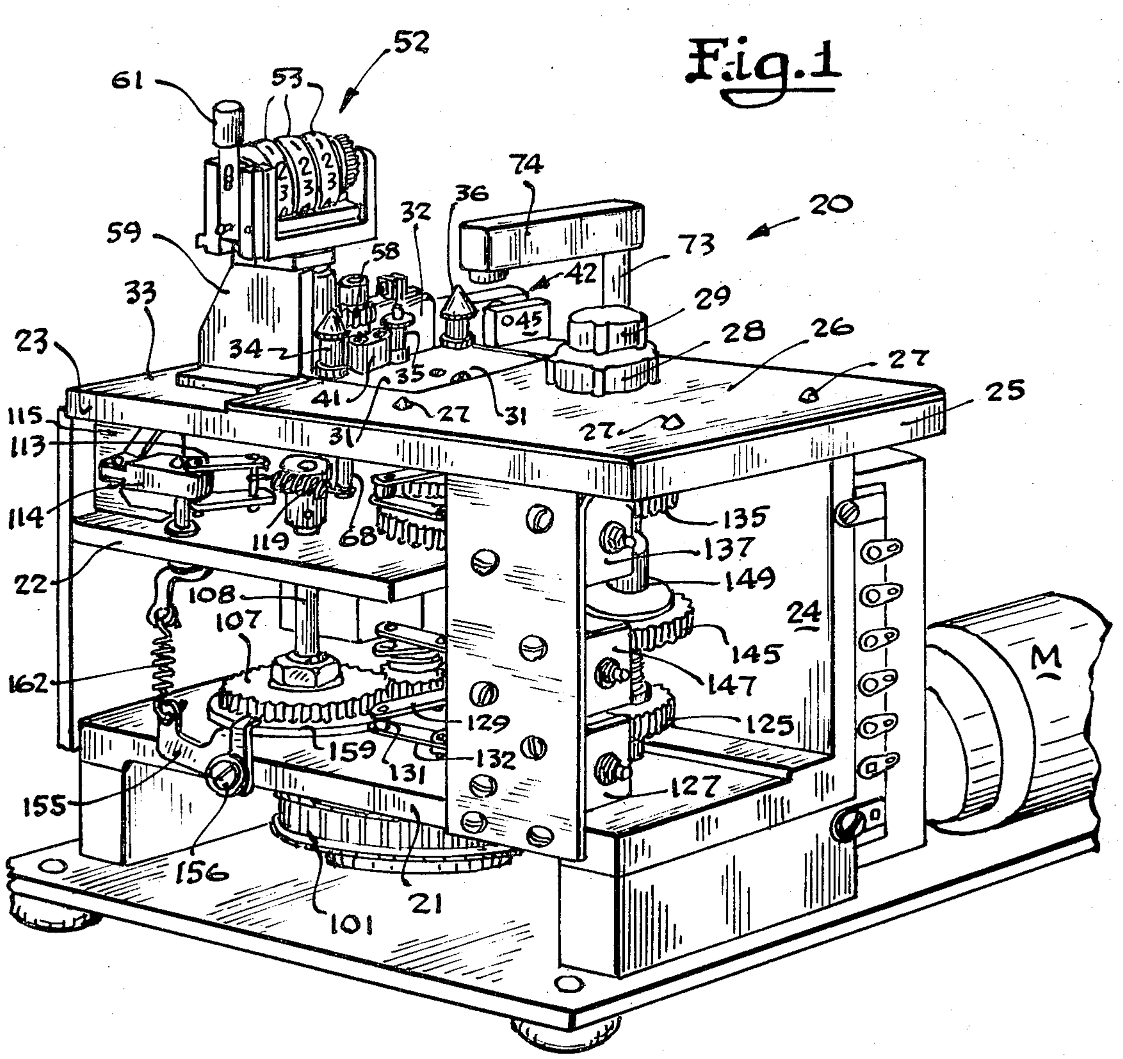
FIG. 1 is a perspective view of a tape deck constructed in accordance with one embodiment of the present invention.
Figure 2:
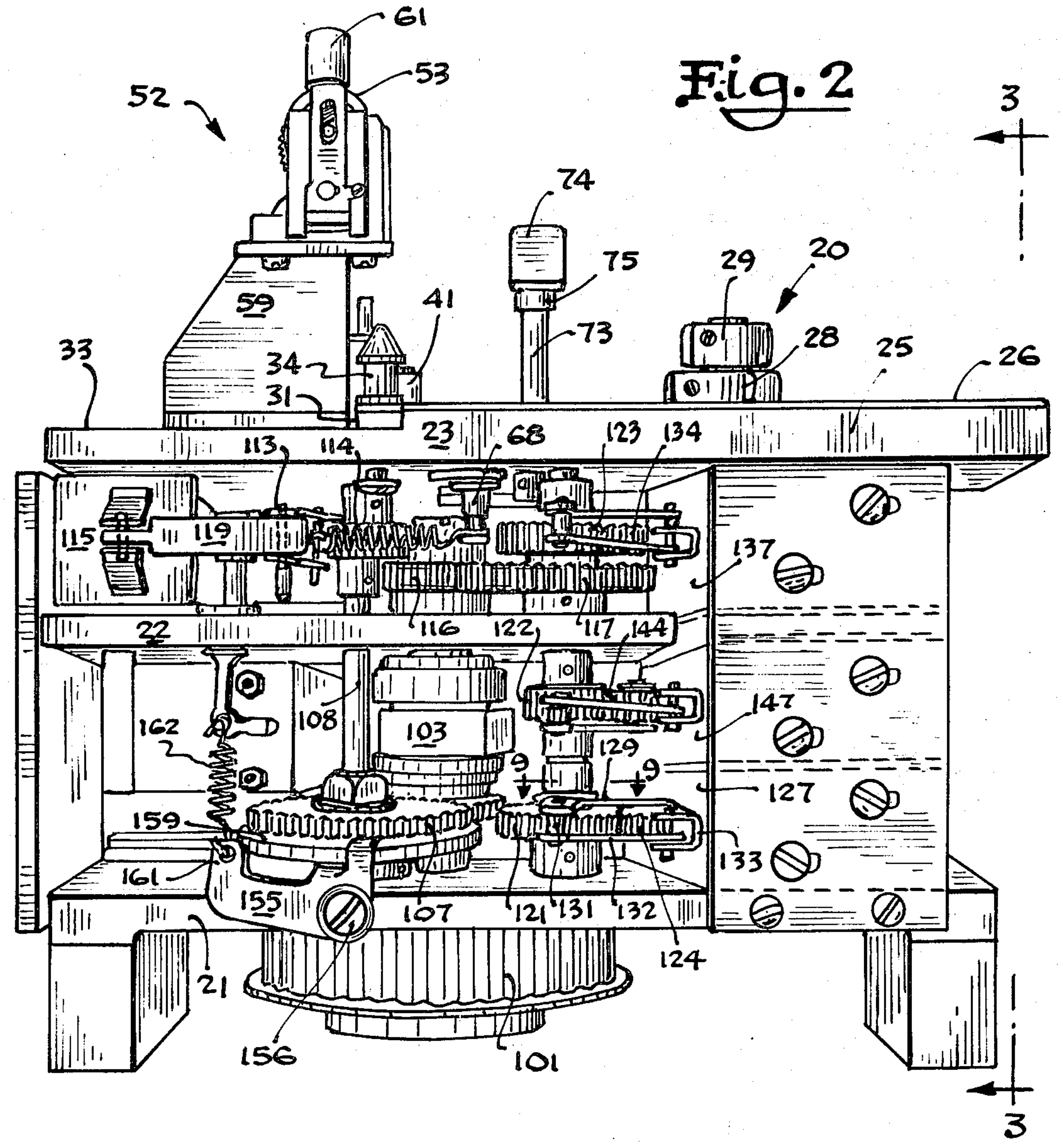
FIG. 2 is a front perspective view of the tape deck of FIG. 1.
Figure 3:
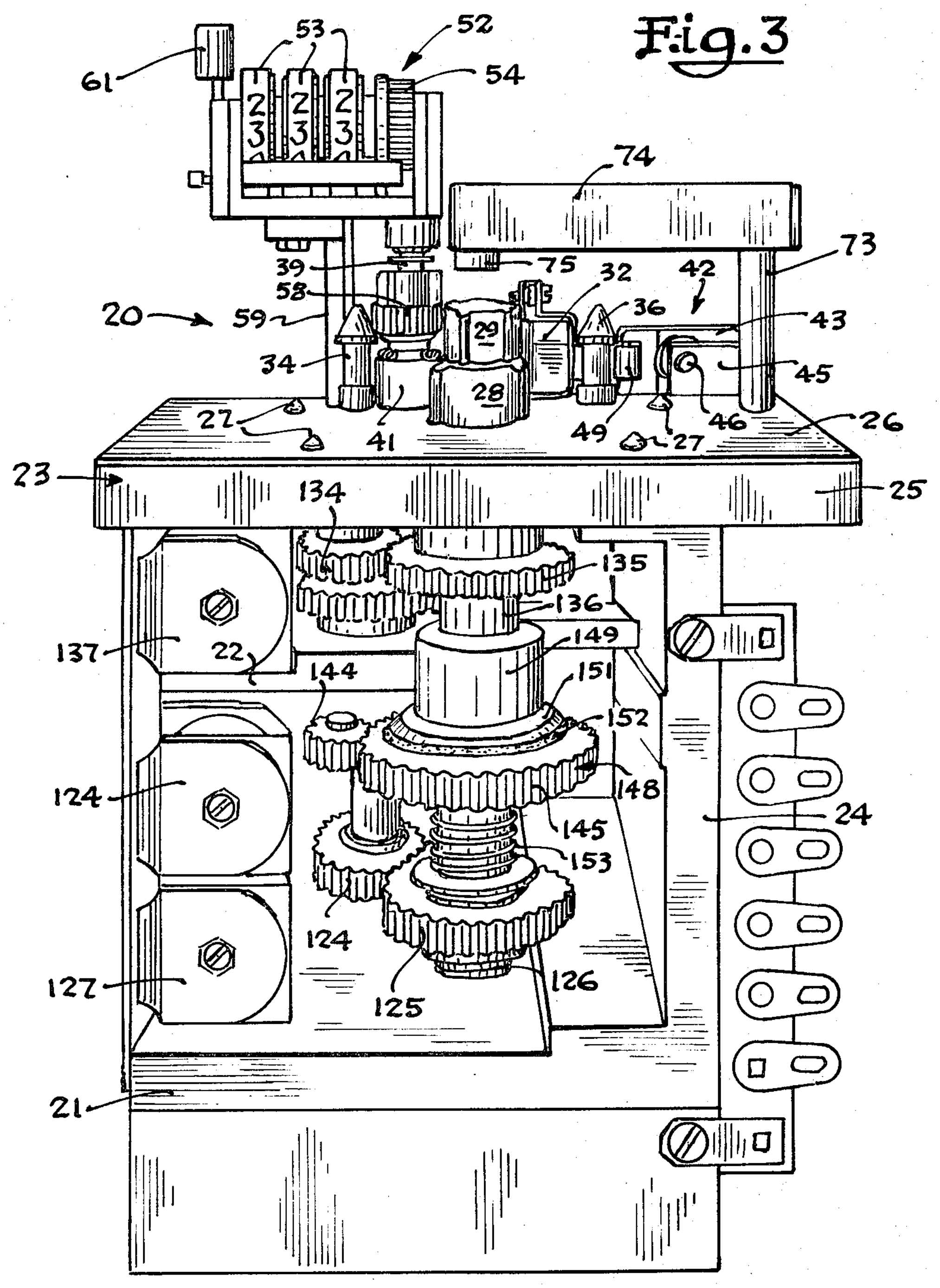
FIG. 3 is a side perspective view taken approximately as indicated by line 3—3 in FIG. 2.

The tape deck 20, constituting a preferred embodiment of the present invention, comprises a frame that includes a lower plate 21, a middle plate 22, and an upper plate 23 (FIGS. 1–3). In the illustrated construction, the three plates 21, 22 and 23 are all formed by machining from a single block of aluminum and are joined by a vertical riser 24. However, the three support plates 21–23 can be fabricated as separate elements and mounted together with appropriate vertical risers, posts, and similar structural elements as desired.

The upper plate 23 is a support plate for a magnetic tape cartridge, and carries the principal operating components of tape deck 20, other than the drive system. Plate 23 is of stepped construction and includes an elevated portion 25 that is covered with a sheet 26 of a phenolic resin cloth laminate. The cover 26 is held in place by four retainers 27 that also serve as guides for positioning a cartridge on top plate 23, as described more fully hereinafter. Near the center of the raised portion 25 of top plate 23, there are two concentric spindles 28 and 29. The lower spindle 28 is a forward drive spindle and the upper spindle 29 is a reverse drive spindle.

Figure 5:
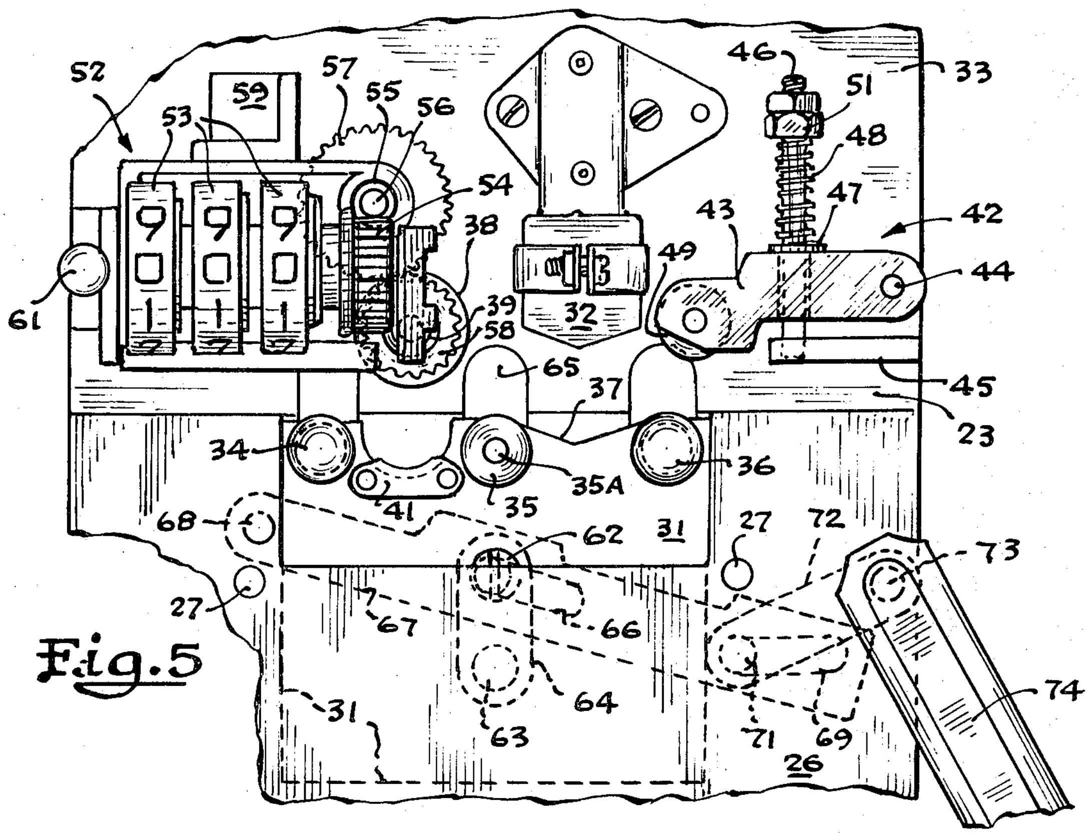
FIG. 5 is a partial plan view of the tape deck ready to receive a tape cartridge.
Figures 6, 7:
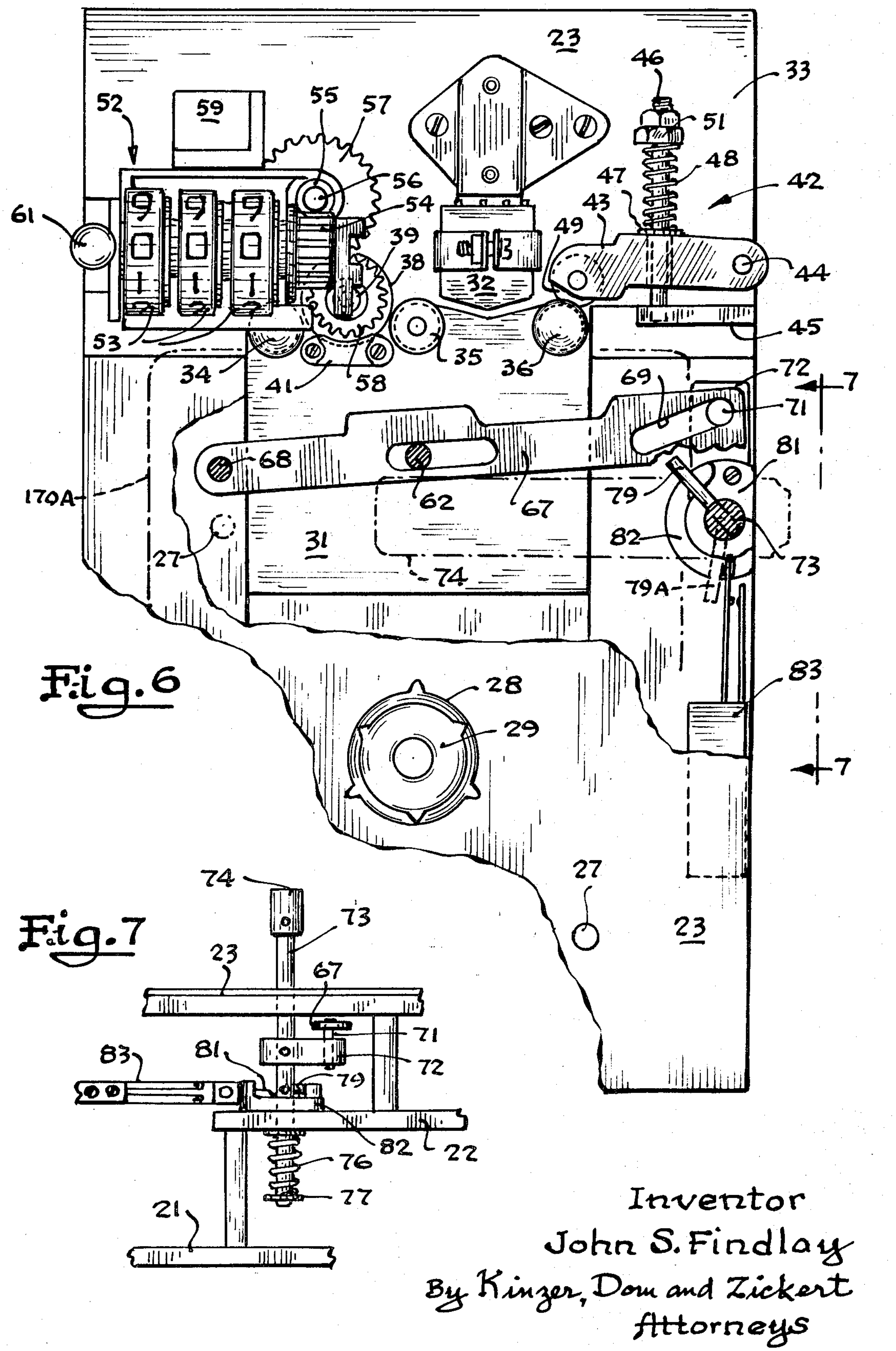
FIG. 6 is a plan view, similar to FIG. 5, showing the tape deck in the operating condition reached when a tape cartridge is mounted therein, with a part of the top support plate cut away to show the operating mechanism.
FIG. 7 is a detail elevation view taken approximately along line 7—7 in FIG. 6.

At the left-hand edge of cover 26, as seen in FIG. 1, a portion of the cover is cut away, revealting the upper surface of a slide 31. Slide 31, preferably formed from a light-weight non-magnetic material, such as a cloth-reinforced phenolic resin laminate, carries a plurality of guide members for displacing and guiding a magnetic tape into engagement with a transducer 32 that is mounted on the lower step 33 of top plate 23 just beyond slide 31. As shown in FIGS. 5 and 6, there are three individual guide members 34, 35 and 36 spaced across the leading edge 37 of slide 31. Guides 35 and 36 are located in alignment with the left and right edges of transducer 32, which may comprise a conventional magnetic recording and reproducing head. Guides 34 and 35, on the other hand, are located in alignment with the outer edges of a sprocket 38 that is mounted on a shaft 39 which projects upwardly through the lower stepped portion 33 of top plate 23. A sprocket shoe 41 is mounted upon slide 31 intermediate guides 34 and 35. The inter-relation between sprocket shoe 41 and sprocket 38, during operation of tape deck 20, is shown in the detail view of FIG. 1A.

Figure 4:
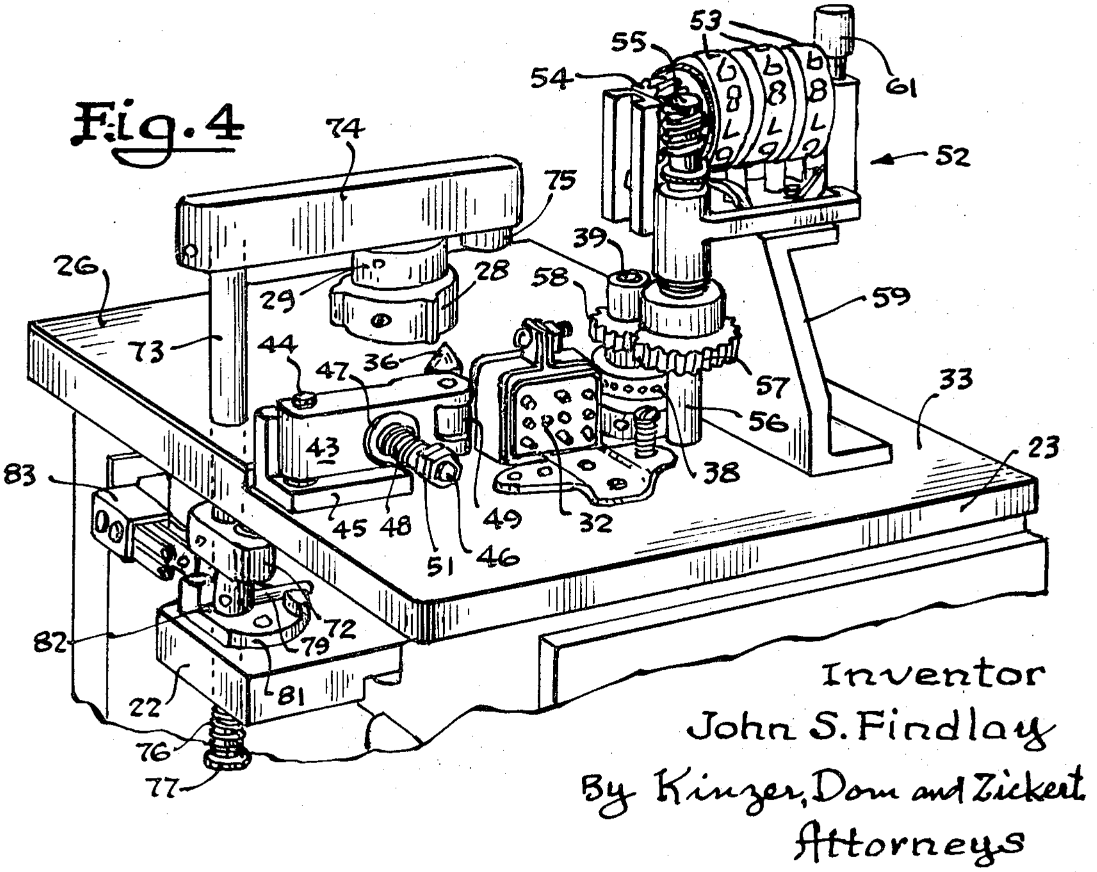
FIG. 4 is a perspective view taken from above and to the rear of the tape deck as seen in FIG. 1.

A tape tensioning and positioning device 42 is mounted upon the lower step portion 33 of top plate 23 on the opposite side of transducer 32 from sprocket 38 (FIGS. 5, 6). Device 42 comprises a tape pressure foot 43 pivotally mounted upon a shaft 44 that is affixed to and projects upwardly from a bracket 45. Bracket 45 is affixed to top plate 23. A horizontal shaft 46 that is affixed to bracket 45 extends through an opening in pressure foot 43; shaft 46 carries a washer 47 that engages pressure foot 43 (FIG. 4). A spring 48 is mounted upon shaft 46 and biases the pressure foot 43 in a counterclockwise direction about shaft 44. The left-hand end of pressure foot 43 carries a roller 49 that engages guide 36, with a force determined by spring 48, when slide 31 is in the position illustrated in FIG. 6. The biasing force exerted by spring 48 can be adjusted by means of an appropriate adjustable stop element 51 on shaft 46, and maintains a light, continuous bias on the tape.

A counter 52 is mounted on the opposite side of the lower step portion 33 of top plate 23 from tape tensioner 42 (FIGS. 3–6). Counter 52 is a conventional mechanical counting device including a series of digital display wheels 53 actuated by a drive gear 54. (The cover of counter 52 is omitted in the drawings). The drive gear 54 is engaged by a worm gear 55 (FIGS. 4–6) on the upper end of a shaft 56. The lower end of shaft 56 carries another gear 57 disposed in meshing engagement with a pinion 58 mounted on the sprocket shaft 39. Counter 52 is mounted upon a bracket 59 that is affixed to the lower step 33 on top plate 23. Counter 52 is provided with a reset button 61 for resetting the counter to zero. Inasmuch as counter 52 is a conventional commercially available device, no further description of its internal construction is provided herein; however, it should be noted that the counter is preferably calibrated in terms of rotational increments of sprocket 38.

The mechanism for actuating slide 31 is also illustrated in FIGS. 4–7. Slide 31 has two central apertures in which a pair of screws 62 and 63 are located. Screw 63 is threaded into a small brass block 64 that fits into and slides in an elongated aperture 65 in the central portion of the upper plate 23. The other screw 62 extends through the brass block 64 and projects through an elongated central opening 66 in a slide positioning lever 67 that is mounted on the lower side of plate 23 (FIG. 7).

The slide positioning lever 67 is pivotally mounted upon a pin 68 that extends down below plate 23 (see FIGS. 2, 5, 6). The end of lever 67 opposite its pivot pin 68 has an elongated slot 69 in which a pin 71 is engaged (FIGS. 5, 6). Pin 71 is mounted on a crank 72 that is affixed to and rotates with a vertical shaft 73. Shaft 73 extends between and projects beyond the two support plates 22 and 23 (FIG. 7). The upper end of the shaft 73 carries an operating handle 74 that also serves as a hold-down element for a cartridge mounted on tape deck 20, as described more fully hereinafter. A hold-down stop 75 is affixed to the free end of the handle 74 (FIGS. 2, 3). The bottom end of shaft 73 projects below the middle plate 22 and has a spring 76 mounted thereon (FIGS. 4, 7). The upper end of spring 76 bears against plate 22 and the lower end of the spring engages a stop member 77 mounted on shaft 73 (FIG. 4).

Lever 72 is pinned to the portion of the shaft 73 intermediate plates 22 and 23. This same section of the hold-down shaft 73 carries a cam follower pin 79 that extends outwardly of the shaft and engages the upper surface of a cam 81 that is mounted upon plate 22 in encompassing relation to the hold-down shaft. The cam track 82 on cam 81 is of accurate configuration, and extends over a total arc of somewhat more than 180°. The two ends of the arcuate cam path are raised and afford definite stop positions for rotation of the hold-down shaft 73. When shaft 73 is at the extreme end of its clockwise rotation, as illustrated in FIG. 5, the cam follower pin 79 engages and actuates a sensing switch 83. This relationship is illustrated by the dash outline 79A for the cam follower pin in FIG. 6.

Figure 8:
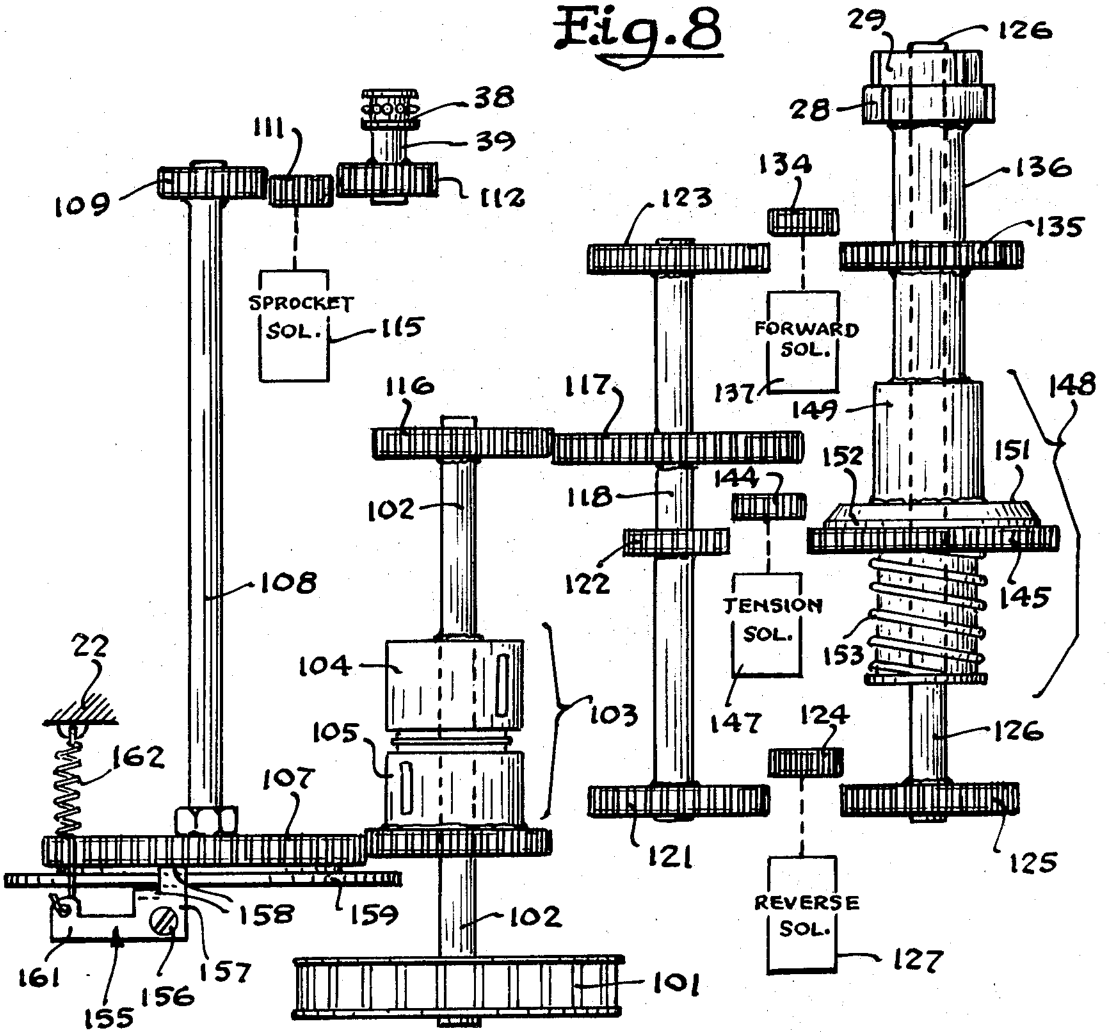
FIG. 8 is a schematic diagram of the drive system of the tape deck.

The drive system for spindles 28 and 29 and sprocket 38 is illustrated schematically in FIG. 8; the individual elements of the several drives are also shown in many of the other views, particularly FIGS. 1–3. The power input to the drive system comprises a pulley 101 that is mounted beneath the lower plate 21 (see FIGS. 1 and 2). Pulley 101 is mounted upon a vertically extending shaft 102 that projects upwardly through the middle plate 22 and into the space between plates 22 and 23.

An incremental drive clutch 103 is mounted upon shaft 102 (FIG. 8). The clutch includes a driving element 104 that is affixed to shaft 102 and a driven element 105 mounted in concentric relation to the shaft.

Clutch 103 is a conventional electrically actuated fixed-cycle spring release clutch of a kind used in many business machine applications, including typewriters and photocopy machines; accordingly, the internal construction of the clutch is not described in detail herein. The clutch employed should be of the type that includes provision for or is readily adapted to continuous energization to provide for a slow forward tape drive, as described hereinafter.

The driven element 105 of clutch 103 is connected to a gear 106. Gear 106 is disposed in meshing engagement with a gear 107 mounted upon a sprocket power shaft 108. Shaft 108 projects upwardly through the middle plate 22, the upper end of the shaft having a pinion gear 109 mounted thereon. Gear 109 is aligned with an idler gear 111 that is in turn aligned with a drive gear 112 mounted upon the sprocket drive shaft 39.

In the actual physical construction for the sprocket drive, the idler gear 111 is mounted upon a bracket 113 that is pivotally movable about the shaft 108 (see FIG. 2). Bracket 113 is biased by a spring 114, connected from the bracket to the fixed pin 68, to maintain idler gear 111 normally in meshing engagement with gears 109 and 112, completing a drive connection between gears 109 and 112 as indicated schematically in FIG. 8. However, bracket 113 is connected to the armature 119 of a solenoid 115 (FIG. 2). Solenoid 115 can be energized to move idler gear 111 out of its meshing engagement with gear 112, interrupting the drive connection from shaft 108 to shaft 39.

The input shaft 102 (FIG. 8) also carries a gear 116 that is in meshing engagement with a driven gear 117 mounted upon a main drive shaft 118. The main drive shaft 118 has three output gears 121, 122 and 123 mounted thereon. Gear 121 is aligned with an idler gear 124 that can be utilized to complete a drive connection from gear 121 to a driven gear 125 mounted upon a vertically extending spindle shaft 126. The drive connection, as indicated in the schematic view of FIG. 8, is normally not completed and is established only upon energization of a reverse spindle solenoid 127.

Figure 9:
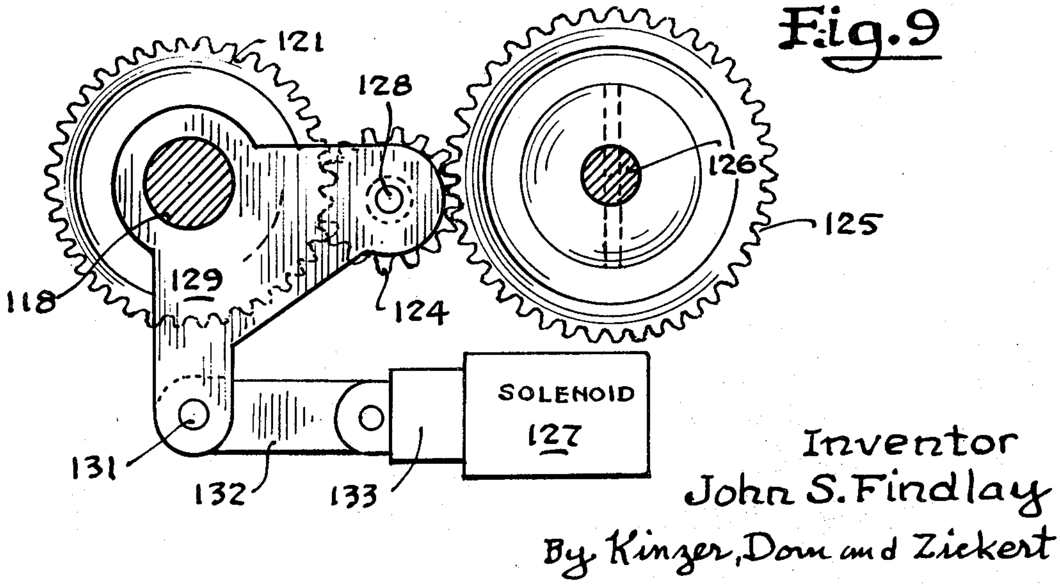
FIG. 9 is a detail view taken approximately along line 9—9 in FIG. 2.

FIG. 9 illustrates a typical construction that can be used for the engagement and disengagement of the drive connection afforded by idler gear 124. As shown in FIG. 9, idler gear 124 may be mounted upon a stub shaft 128 in turn mounted upon one arm of a bell-crank 129. Crank 129 is mounted upon shaft 118 but is pivotally movable relative to the shaft. The other arm of crank 129 carries a pin 131 that is connected to a link 132. Link 132, in turn, is connected to the armature 133 of the reverse spindle solenoid 127. In FIG. 9, the operating components, particularly including gears 121, 124 and 125, crank 129, and link 132, are shown in the operating position achieved when solenoid 127 is energized. When the solenoid is de-energized, a bias spring incorporated in the solenoid drives the armature 133 outwardly of the solenoid, pivoting crank 129 in a clockwise direction and releasing gear 124 from its driving engagement with gear 125.

The upper gear 123 on main drive shaft 118 is aligned with an idler gear 134 that is in turn aligned with a forward spindle drive gear 135 (FIG. 8). The forward spindle drive gear 135 is mounted upon a hollow shaft 136 that is coaxial with the reverse spindle drive shaft 126. The drive arrangement between gears 123 and 135 is the same as for gears 121 and 125; a forward spindle solenoid 137 is energized to shift idler gear 134 to a position in which it completes an operating connection between the gears 123 and 135. The mechanical linkage for the idler gear 134 may be the same as described above for gear 124 (FIG. 9).

The center gear 122 on the main shaft 118 is aligned with an idler gear 144. The idler gear 144 is also aligned with a drive gear 145 supported in concentric relation to shaft 136 (FIG. 8). Idler gear 144 can be shifted into and out of a drive connection position by means of a tension solenoid 147. The mechanical linkage for the idler gear 144 may be the same as for the other idlers 124 and 134 (FIG. 9).

Drive gear 145 is the input or driving member of a tension clutch 148. The driven element of the clutch comprises a hub 149 having a relatively large flange 151 that engages a felt washer 152 mounted on the upper face of gear 145. A spring 153 biases the two clutch elements 145 and 151 together, affording a friction drive through the felt washer 152. Substantial slippage is permissible, however, at all times. That is, the clutch 148 is not utilized to afford a direct drive at any time, but constitutes a slip connection to permit the take-up of slack tape in operation of the tape deck.

The drive mechanism for tape deck 20 also includes a stop apparatus for preventing overtravel and backlash in the operation of the sprocket drive. This apparatus comprises a stop crank 155 that is pivotally mounted upon a pin 156 affixed to the lower support member 21, as shown in FIGS. 1, 2 and 8. One arm 157 of crank 155 includes a pair of stop elements 158 that engage the opposite edges of the rim of a disc 159 that is a part of the drive gear 107 for the sprocket drive shaft 108. The other arm 161 of crank 155 is connected to one end of a spring 162. The other end of spring 162 is affixed to support member 22, as shown in FIGS. 1 and 2.

Figure 10:
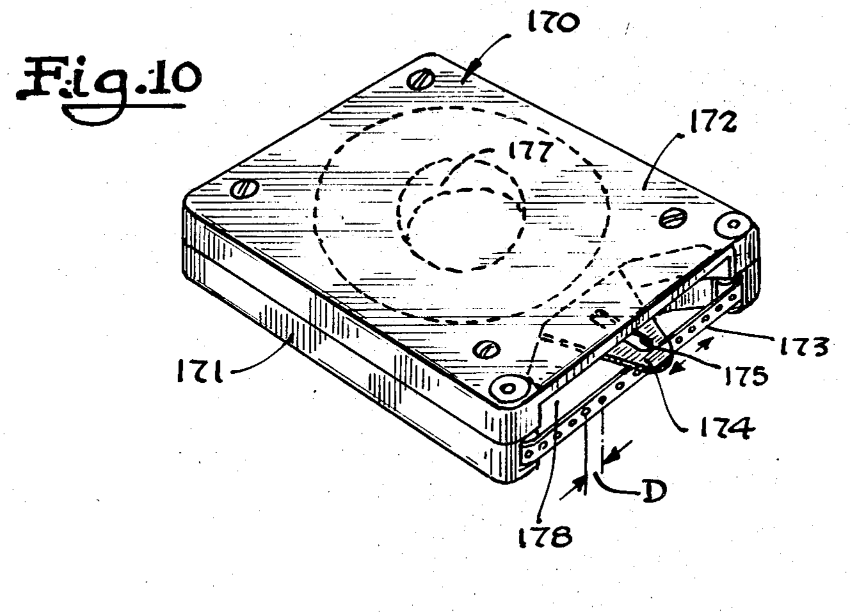
FIGS. 10 and 11 are perspective views of a tape cartridge, utilized in explaining operation of the tape deck.
Figure 11:
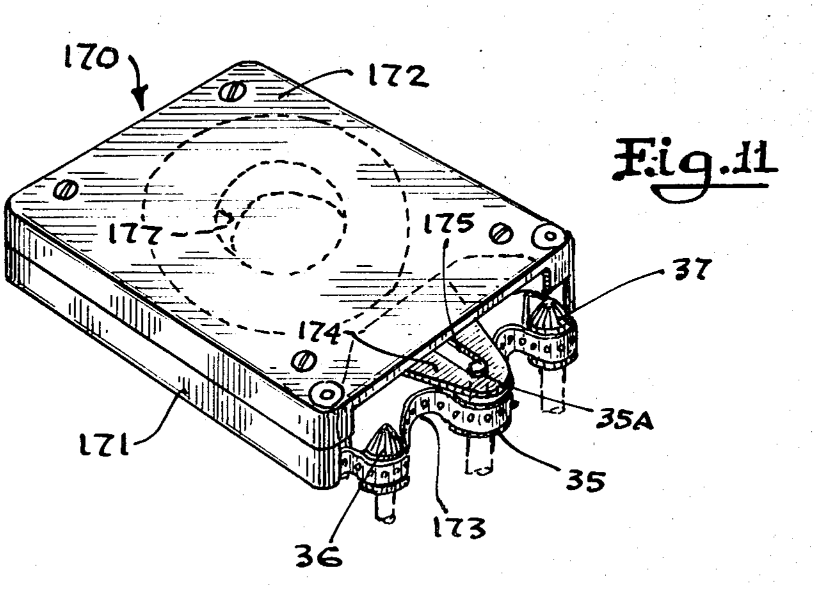

Before considering operation of tape deck 20, it is useful to consider the kind of tape cartridge with which the tape deck is used. A typical cartridge construction is shown in FIGS. 10 and 11; FIG. 10 shows the tape cartridge 170 prior to mounting on the tape deck, and FIG. 11 illustrates the cartridge 170 when it is mounted on the tape deck and ready for use.

Cartridge 170 includes a plastic housing formed of a lower housing member 171 and an upper housing member 172. A magnetic tape 173, punched for sprocket engagement, is stored within the housing on two vertically stacked storage hubs, one located in lower housing member 171 and the other in upper housing member 172. A portion of tape 173 extends across an access opening 178 in the front portion of the lower housing member 171. In a typical cartridge, the tape stored may be 200 feet in length, one-fourth inch wide, and 1.5 mils thick; "sandwich" tape is preferred. Tape 173 is punched with sprocket holes, at a spacing D; a typical spacing D is 0.1 inch. Such a tape can store up to 24,000 eight-bit characters on a single track. Several tracks can be employed.

In the preferred construction for tape cartridge 170, the tape cartridge is provided with an internal brake mechanism that normally prevents displacement of magnetic tape 173 between the two storage reels in the cartridge. A preferred form of brake mechanism is described and claimed in the aforementioned co-pending application of John S. Findlay. The brake is actuated by a slide 174 that projects a short distance outwardly of the front of the cartridge along the juncture between housing members 171 and 172. When cartridge 170 is not in the tape deck, slide 174 is normally maintained in a retracted position as shown in FIG. 10, by means of an internal spring (not shown) in the cartridge. Slide 174 is provided with an opening 175 for receiving the tip portion 35A of the central guide 35 of the tape deck.

When tape deck 20 is placed in operation, the operating elements of the tape deck are in the position illustrated in FIG. 5, with the holddown lever 74 at the extreme counterclockwise end of its travel. Slide 31 is retracted and guides 34, 35 and 36 are spaced from the magnetic head, sprocket, and other functional components of the deck. With the mechanism in this position, cartridge 170 is placed on the top of the deck, fitting over the two spindles 28 and 29, which extend into the cartridge in the center part of housing members 171 and 172 respectively. The cartridge is located approximately as indicated by phantom outline 170A in FIGS. 5 and 6. The cartridge is accurately positioned by engagement with the four retainers 27 on the upper surface 26 of support 23. With the cartridge properly placed on the tape deck, the tape guides 34, 35 and 36 are disposed behind the exposed portion of magnetic tape 173 (see FIG. 10) and the tip 35A of the center guide 35 projects into the slot 175 in slide 174.

With the cartridge properly positioned on the tape deck, the operator pivots the holddown lever 74 in a clockwise direction from the position shown in FIG. 5 to the position shown in all of the other drawings. As the holddown lever 74 turns, it rotates its shaft 73 to a corresponding extent, the cam follower pin 79 riding around on the cam surface 82 of cam 81 from the phantom position 79A to the solid line position shown in FIG. 6. Near the end of the rotation of shaft 73, pin 79 engages a part of cam surface 82. Consequently, shaft 73 and holddown lever 74 move downwardly a short distance in response to the bias provided by spring 76. Thus, at the time the holddown lever 74 reaches the position shown in FIGS. 1–4, the stop element 75 on the lever engages a central area 177 on the cartridge 170 (FIGS. 10, 11) and holds the cartridge firmly in accurately aligned position on the tape deck.

The pivotal movement of holddown lever 74 and shaft 73 also shifts crank 72 from the position shown in FIG. 5 to that illustrated in FIG. 6. As a consequence, the slide positioning lever 67 is pivoted counterclockwise about pin 68. The movement of lever 67, in turn, shifts slide 31 toward the magnetic head and sprocket of the tape deck, from the position of FIG. 5 to that of FIG. 6. The guides 34–36 on slide 31 pick up the magnetic tape in the cartridge and pull the tape outwardly into engagement with the magnetic head 32. The sprocket shoe 41 and guides 34 and 35 bring the tape firmly into engagement with sprocket 38. At guide 36, the tape is also engaged by roller 49 in the tape tensioner and positioner 42, which holds the tape firmly against guide 36. This complete movement and positioning of the tape is made possible because the cartridge slide 174, through its engagement with the tip 35A of guide 35, is pulled outwardly of the cartridge to a brake-released position as shown in FIG. 11. Thus, with the cartridge in operational position on the tape deck, all of the components are in the position illustrated in FIG. 6.

Once the tape cartridge has been properly mounted on the tape deck 20, there are several possible modes of operation afforded by the drive system of the tape deck. For continuous recording or readout operations, a slow forward motion of the tape is provided. This slow forward mode is accomplished by continuously energizing clutch 103 and tension solenoid 147 while maintaining sprocket solenoid 115, reverse solenoid 127 and forward solenoid 137 unenergized. For these conditions, the continuously rotating input shaft 102 drives the sprocket drive shaft 108, through clutch 103 and gears 106 and 107. Because solenoid 115 remains de-energized, the driving connection from shaft 108 to sprocket 38 is completed through gears 109, 111 and 112 and shaft 39. The gear ratios are chosen to afford a reasonable read/record speed for the tape, as driven by sprocket 38; as an example, a tape speed of approximately 5 inches per second may be utilized. It will be recognized that other tape speeds may be chosen, depending upon the requirements of the data processing equipment in which the tape deck is employed.

The energization of tension solenoid 147, during slow forward drive operation, does not control the speed of the tape and does not provide a positive drive for the tape. However, with solenoid 147 energized, gear 144 is positioned to complete a driving connection from gear 122 on the continuously rotated shaft 118 to gear 145 in clutch 148. As a consequence, a slip drive is established, through clutch 148 and shaft 136 to the forward sprocket 28 of the tape deck. This drive is only strong enough to take up the slack of tape fed through the cartridge by sprocket 38 and is not effective to afford an independent drive for the tape.

A second mode of operation for tape deck 20 is an incremental advance of the tape. The basic drive conditions are the same as for slow forward operation, described above. The sprocket solenoid 115, reverse solenoid 127, and forward solenoid 137 are all maintained de-energized. Tension solenoid 147 is continuously energized to provide a takeup rotation at sprocket 28. For incremental advance of the tape, clutch 103 is energized with pulses of a duration just sufficient to engage the clutch for fixed-cycle operation. The clutch remains engaged for a fixed part of a rotational cycle, then drops out automatically. Each clutch cycle causes sprocket 38 to rotate through an angular distance just sufficient to advance tape 73 by the distance D between two of the sprocket apertures in the tape (FIG. 10). In a typical installation, the pulses supplied to clutch 103 may be of the order of ten milliseconds duration. The operation is exactly as described above for slow forward operation except that the tape advances on an incremental basis.

For search, re-wind, and related purposes, rapid movement of the tape in either a forward direction or a reverse direction is usually necessary. In tape deck 20, rewinding is accomplished by a fast reverse movement of the tape. To achieve this movement, sprocket solenoid 115 and reverse solenoid 127 are both energized continuously. Clutch 103, forward solenoid 137, and tension solenoid 147 are kept de-energized.

With clutch 103 de-energized, there is no drive coupling to shaft 108 and hence no positive drive to sprocket 38. However, complete mechanical release for the sprocket is necessary for fast tape movement to prevent tearing the tape. The energization of solenoid 115 shifts gear 111 out of engagement with gear 112 and releases the sprocket 38 for free-wheeling movement. Consequently, the energization of solenoid 127, which pivots gear 124 into its driving position engaging both of the gears 121 and 125 (see FIG. 9), completes a drive connection to the reverse drive shaft 126, and hence to the reverse spindle 29. It is thus seen that the spindle can operate to move the tape rapidly, in reverse direction, in the tape cartridge. In a typical tape deck, the reverse movement of the tape may occur at a speed of about 30 inches per second.

Fast forward movement of the tape may also be necessary, particularly during search operations. This is accomplished by energizing solenoid 115 to release sprocket 38 for free-wheeling movement and by energizing the forward solenoid 137. Solenoid 137 shifts gear 134 into position to complete a positive drive from gear 123 to gear 135, thus rotating shaft 136 and its spindle 28. The other solenoids remain de-energized, the fast forward drive functioning in essentially the same manner as the fast reverse drive.

In any magnetic tape system in which data are recorded in discrete blocks or increments along the path of the tape, precise control of increment length may be essential to accurate and effective operation. In the operation of tape deck 20, the preferred incremental length, for many applications, is the spacing between adjacent sprocket holes in the tape (FIG. 10.) Incremental movement of the tape could be achieved by utilization of a stepping motor drive but this would not be desirable from the standpoint of the versatile drive arrangement of the tape deck, described above, which is predicated upon the use of a continuously operating drive motor. But precise control of the incremental advance of the tape is achieved by use of the fixed-cycle clutch 103.

Backlash and overtravel are effectively inhibited, in the drive system of tape deck 20, by the operation of stop crank 155. Spring 162 continuously biases crank 155 toward rotation in a clockwise direction to cause the two stop lugs 158 to grip the rim of disc 159 on gear 107. With a positive drive applied to gear 107, disc 159 slides through the gap between lugs 158, overcoming the bias and rotating shaft 108. But as soon as clutch 103 is de-energized and the positive drive is interrupted, stop crank 155, under the impetus of spring 162, pivots to grip disc 159 and immediately stop the rotation of gear 107. Accordingly, backlash and overtravel are effectively inhibited.

Figure 1A:
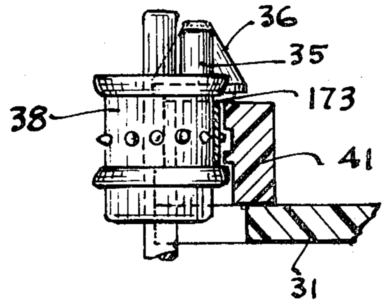
FIG. 1A is a detail view of a drive sprocket used in the tape deck.

Effective operation of the tape deck depends to a substantial extent upon the maintenance of effective engagement between the magnetic tape and sprocket 38. It is also important that the tape be maintained in close engagement with the face of magnetic transducer 32, since any extraneous air gap between the tape and the recording-reading head may create substantial errors. Shoe 41 maintains tape 173 in effective engagement with sprocket 38 whenever slide 31 is advanced to its working position (FIG. 6). The close interfitting relationship of shoe 41 and sprocket 38 is best illustrated in FIG. 1A. Sprocket 38 and shoe 41 also cooperate to maintain the tape in close engagement with the left-hand side of the reading and recording head 32 as viewed in FIG. 6.

The tape tensioner and positioner 42 assures effective engagement of the tape with the other side of head 32. Roller 49 presses the tape against the guide 36 and keeps the tape relatively taut between guides 35 and 36. By adjusting spring 48, effective and accurate control of the tape, in its engagement with head 32, can be readily maintained without the problems of excessive pressure encountered in a capstan drive.

Counter 52 is continuously connected to sprocket shaft 39. Moreover, sprocket shaft 39 is rotated by sprocket 38 for all movements of the tape, including incremental, slow forward, fast forward, and reverse movements. Consequently, because the counter is geared to afford a direct indication in terms of tape increments, the count on the counter affords an accurate identification of the tape position at all times. This assumes, of course, that the counter is set to the current tape position when the cartridge is mounted on the tape deck. The inertia of the counter itself is quite low and does not interfere appreciably with either fast forward or fast reverse tape drives.

To provide the most versatile operation, the tape in the cartridge is preferably provided at both ends with a conductive strip for shorting a pair of contacts in the tape deck, or with some other means to generate a signal that can be used to shut off the drive for the tape deck. In the illustrated construction, guides 34–36 can be used as shorting contacts. With an arrangement of this kind, setting of counter 52 can be accomplished by energizing the reverse drive as described above and allowing it to operate continuously until automatically stopped by the conductive segment of the tape. The counter reset button 61 can then be actuated to reset the counter to zero. Forward motion of the tape can then be effected to record data, or a search mode can be initiated to identify previously recorded data on the tape.

In many applications, at least one track on the magnetic tape is utilized as an "address" track for the recording of identification data to locate different items recorded on the tape. To search for a given item, with tape deck 20, the reverse drive may be energized as described above through a circuit that also energizes head 32 to read the address track on the tape. The fast reverse direction is maintained until the desired address is identified, at which point the drive is de-energized. The tape will coast a few increments further. The tape deck can then be energized for incremental forward operation until the same identification pulse is located.

When the tape cartridge is to be removed from tape deck 20, all drive systems are first de-energized. The operator then turns hold-down lever 74 in a counterclockwise direction back toward the position of FIG. 5, lifting somewhat on the holddown lever at the beginning of the turning movement to help overcome the bias of spring 76. As shaft 73 is rotated, by movement of lever 74, an appropriate circuit is energized to provide an energizing signal to solenoid 147 to energize the forward take up drive for the tape for a brief interval. This is done in order to pull the tape into cartridge 170 in the position illustrated in FIG. 10 as the brake slide 174 is returned to its braking position. Thus, the tape is fully retracted into the cartridge at the time the cartridge is removed from the tape deck. The sensing switch 83 may be utilized to control this operation, in conjunction with the cam follower pin 79.

Slippage, accumulative error, homing inconsistencies and numerous other difficulties inherent in capstan drive systems are completely eliminated with the sprocket drive of the present invention. The pressure applied to the tape by the tensioner and positioner 42 of tape deck 20 is not required to exert the heavy pinch pressure essential to compensate for changing inertia conditions in a capstan drive. There is little or no risk of any permanent roller or guide deformation for any part of tape deck 20, due to the low pressures and tension forces involved. The interface between the tape and the drive sprocket is always positive so that no slippage can occur. Acceleration is predictably accurate regardless of the quantity of tape that has been fed from one reel to the other in the storage cartridge.

The drive arrangement of tape deck 20, which releases sprocket 38 for free wheeling whenever either fast forward or fast reverse drives are used, precludes damage to the tape from excessive tension. If, for any reason, the rotation of sprocket 38 is blocked, the quadrant gears used in each of the drives (gears 111, 124, 134 and 144) will disengage, eliminating the possibility of damage to the tape.

Tape deck 20 is extremely flexible in its operational characteristics. It can be rack or console mounted or totally enclosed. The drive motor can be mounted in any desired orientation and one motor can be used to drive several tape decks, since each tape deck utilizes a continuous input drive. Because there are no pinch rollers and no pressure pads, the life of tape 173 and head 132 is materially increased. Tape deck 20 can operate reliably at any temperature from —40° to +140°F.

I claim:

1. An incremental data-processing tape deck for recording data upon and reproducing data from a magnetic tape mounted in a cartridge for movement, within the cartridge, in forward and reverse directions, along a path that extends across an access opening in the cartridge, the tape having a series of longitudinally equally spaced sprocket holes, comprising:

support means for supporting a tape cartridge in a given operational position;

spindle means, comprising at least one spindle projecting outwardly of said support means and engaging a tape cartridge supported in said operational position, for driving the tape across said access opening in at least one direction;

a transducer, positioned in predetermined spaced relation to the access opening in a tape cartridge located in said operational position;

incremental drive means, comprising a sprocket positioned adjacent said transducer in spaced relation thereto and in predetermined spaced relation to said access opening, for positively engaging the sprocket holes in the tape and driving the tape across said access opening in a given forward direction in incremental steps of equal predetermined length;

tape guide means for displacing a limited portion of tape outwardly of said access opening and into engagement with said transducer and said incremental drive means, said tape guide means comprising a slide movable between a retracted position and an engagement position, said slide having a plurality of tape guide members mounted thereon that project into said access opening in the tape cartridge when the slide is in its retracted position and that hold the tape in engagement with said transducer and said sprocket of said incremental drive means when the slide is in its engagement position;

a cartridge holddown member movable between a released position clear of said tape cartridge operational position and an engagement position engaging a tape cartridge located in said operational position;

and actuating means for actuating said cartridge holddown member and said slide conjointly between their respective released and engagement positions.

2. An incremental data-processing tape deck according to claim 1 in which said guide members are at least three in number, one guide member aligned with the central portion of the access opening in the tape cartridge and with the space between the transducer and the incremental drive means, the other guide members being aligned with the opposite ends of said access opening.

3. An incremental data-processing tape deck according to claim 1, and further comprising release means, in said incremental drive means, for releasing said sprocket for free wheeling movement whenever said spindle means is operated to drive the tape across said access opening in either direction.

4. An incremental data-processing tape deck according to claim 1, further comprising a shoe of relatively soft plastic, mounted on said slide, and having a configuration complementary to the configuration of said sprocket, for assuring positive engagement between the tape and the sprocket.

5. An incremental data-processing tape deck according to claim 1 and further comprising a tape tensioner and positioner means, including a roller aligned with the outside guide member adjacent said transducer, for continuously maintaining a light rolling pressure against the tape at said outside guide member when said tape guide slide is in its engagement position.

6. An incremental data-processing tape deck according to claim 1, for use with a tape cartridge having two coaxially stacked storage hubs, in which said spindle means comprises two coaxial spindles, forward drive means for driving one spindle to move the tape rapidly in a forward direction, and reverse drive means for driving the other spindle to move the tape rapidly in a reverse direction.

7. An incremental data-processing tape deck according to claim 6 in which the forward drive means comprises a positive forward drive for moving the tape at a high speed, and a forward takeup drive, for taking up slack in the tape when the tape is advanced by said sprocket.

8. An incremental data-processing tape deck according to claim 7, in which said forward takeup drive includes a slip clutch to permit continuous actuation of the takeup drive without undue stress on the magnetic tape.

9. An incremental data-processing tape deck according to claim 6 in which the forward drive means, the reverse drive means, and the incremental drive means each includes a drive gear, a driven gear, and a connecting gear, the connecting gear of each drive means being mounted upon a crank that is pivotally movable, about an axis concentric with the axis of the associated drive gear, between a released position in which the connecting gear is disengaged from the associated driven gear and a driving position in which the connecting gear is engaged with the driven gear, bias means for biasing said crank toward one of said positions, and electrically actuated means for actuating the crank to the other of said positions.

10. An incremental data-processing tape deck according to claim 9 in which the crank of said incremental drive means is biased toward its driving potion and in which the cranks of the forward and reverse drive means are each biased toward their released positions.

11. An incremental data-processing tape deck according to claim 6, in which said incremental drive means includes an electrically actuated fixed-cycle clutch for actuating said sprocket to rotate in increments each equal in length to an arc equal to the spacing between adjacent sprocket teeth.

12. An incremental data-processing tape deck according to Claim 11, in which said incremental drive means further comprises a rotatable disc, incorporated in the drive means on the sprocket side of said fixed-cycle clutch, a pivotally mounted stop crank having a pair of stop elements engaging opposed surfaces at the rim of the disc, and biasing means biasing said stop crank into engagement with said disc to preclude excessive overtravel and backlash in said incremental drive.

* * * * *